United States Patent [19]

Marx

[11] Patent Number: 4,615,923

[45] Date of Patent: Oct. 7, 1986

[54] WATER-ABSORBING INSERT FOR FOOD PACKS

[76] Inventor: Rudolf Marx, Rittershofstrasse 14, D-6670 St.-Ingbert-Hassel, Fed. Rep. of Germany

[21] Appl. No.: 470,706

[22] Filed: Feb. 28, 1983

Related U.S. Application Data

[63] Continuation of Ser. No. 299,606, Sep. 4, 1981, abandoned.

[30] Foreign Application Priority Data

Sep. 11, 1980 [DE] Fed. Rep. of Germany ....... 3034169

[51] Int. Cl.$^4$ ............................................ B65D 25/02
[52] U.S. Cl. .................................... 428/35; 206/204; 426/124; 426/129
[58] Field of Search ................ 426/124, 129; 206/204; 428/35

[56] References Cited

U.S. PATENT DOCUMENTS

| | | | |
|---|---|---|---|
| 4,036,360 | 7/1977 | Deffeyes | 426/124 |
| 4,124,748 | 11/1978 | Fujimoto et al. | 526/8 |
| 4,275,811 | 6/1981 | Miller | 426/124 |
| 4,321,997 | 3/1982 | Miller | 426/124 |

FOREIGN PATENT DOCUMENTS

| | | | |
|---|---|---|---|
| 2003836 | 3/1979 | United Kingdom | 426/124 |
| 2024781 | 1/1980 | United Kingdom | 426/129 |

OTHER PUBLICATIONS

Kirk-Othmer, Encyclopedia of Chemical Technology, 2nd ed., 1969, vol. 17, pp. 399-400.
Lipscomb, Cellulose Acetate, 1938, pp. 18, 273.

*Primary Examiner*—John E. Kittle
*Attorney, Agent, or Firm*—Peter K. Kontler

[57] ABSTRACT

A water-absorbing insert is provided for food packs. The insert is adapted to be used in direct abutment with the food, typically poultry, fish, meat and sausage. It comprises an outer covering and an inner filling. The outer covering, configured as a flat bag, is pervious to water and is preferably made from an acid free paper such as, for example, bleached cellulose acetate crepe paper. The filling includes kieselguhr and an organic gel former selected from the group consisting of carboxymethyl cellulose, cellulose ether, polyvinyl pyrrolidon, starch, dextrose, gelatin and pectin.

9 Claims, No Drawings

WATER-ABSORBING INSERT FOR FOOD PACKS

This application is a continuation of application Ser. No. 299,606, filed 9-4-81, now abandoned.

BACKGROUND OF THE INVENTION

The invention relates to a water-adsorbing insert for food packs, of the type suitable for the storage of meat, poultry, fish and sausage, contained in a bag, more especially a flat one intended for direct abutment against the food and made from a foil which is pervious to water, more especially made from paper which is free from acid and a filling made from an absorbent material.

Such a water absorbing insert is taught in German Offenlegungsschrift No. 22 63 766. It contains, as a filling, an inorganic material in fine-grained absorbent form. Such inserts are used with a filling of kieselguhr.

These inserts, as compared with the previously-used inserts taught in German Gebrauchsmuster No. 70 46 539 are made from cellulose fleece, and offer the advantage of containing no nutrients for bacterial growth.

It is, however, very difficult to find filling materials which comply with foodstuffs law and at the same time offer the greatest possible water absorption capacity for the absorbing of meat juice or the like.

The problem underlying the invention is to provide an insert of the kind designated at the introduction hereto which has a greater water absorption capacity than the known inserts.

SUMMARY OF THE INVENTION

In accordance with the invention, the filling of the present invention consists at least partially of an organic gel former selected in a preferred embodiment, from the group of organic gel formers consisting of carboxymethyl cellulose, cellulose ether, polyvinyl pyrrolidon, starch, dextrose, gelatin and pectin.

DESCRIPTION OF THE PREFERRED EMBODIMENTS

Thus, recourse is again had to the organic material and to the extent of bacterial nutriment made available. Water, which is indispensable to support bacterial growth, is absorbed by the organic material, which may include concentrations of relatively small solid matter. The organic material acts as a gel former and is capable of binding up the water in sufficient amounts so that there is insufficient water available to support bacterial activity. The amount of water which can be bound in this way by a gel former is greater than the water absorption capacity of the previously-used inorganic insert fillings.

At the same time, the admissibility under foodstuffs law is no longer a problem. A large number of organic gel formers are available which are used in foods themselves, above all as thickening agents. These are, in accordance with the invention, now used beside the food only in their physical property as absorbers for the isolation of the water in the packing space.

The principle of preventing bacterial growth by water binding has, in addition to this, yet another considerable advantage. It also renders ineffectual the bacteria nutrients which the water emerging from the food brings along from this, such as colloidal or dissolved albumens in the meat juice.

The increased water absorption capacity makes the inserts in accordance with the invention more especially suitable for poultry, fried sausage and white sausage, all of which display a comparatively strong juice separation.

It is also possible, and can be advantageous, to mix the filling material in accordance with the invention with another one, in order to optimize the properties for a specific purpose. For poultry, and even more for fish, for example a mixture with the already-mentioned kieselguhr in combination with a further material, mentioned elsewhere, is a possibility, in which respect the combination of kieselguhr with this material has a highly improved preservation effect and brings-in the mixture with the gel former.

Like the previous ones, also the inserts in accordance with the invention will primarily be used for vacuum packs and tray packs.

Carboxymethyl cellulose, cellulose ether, polyvinyl pyrrolidon, starch, dextrose, gelatine and/or pectins are preferred organic gel formers.

EXAMPLE

A practical example of an insert in accordance with the invention will be described briefly as follows:

4 grams of a mixture of 10 to 20 percent of a sodium carboxymethyl cellulose known under the trade name of "TYLOPUR" with kieselguhr and possibly further additives are admixed to form a cushion filling, which is then placed between two paper blanks of $7 \times 10$ cm size which are adhered to one another all around the edge. The paper is a bleached cellulose-crêpe-paper which is usable as filter paper. It is provided with a worked-in net foil of PVC which makes it sufficiently durable even in the wet state.

What is claimed is:

1. A water-absorbing, bag insert for food packs adapted to directly contact food, said insert having a water pervious outer covering containing an absorbent filling, and said filling including at least one member of the group consisting of water absorbing, organic gel formers capable of binding up water and being essentially free of all organic materials other than the members of said group.

2. The insert of claim 1 wherein said gel former is selected from the group consisting of carboxymethyl cellulose, cellulose ether, polyvinyl pyrrolidon, starch, dextrose, gelatin and pectin.

3. The insert of claim 2 wherein said gel former is carboxymethyl cellulose.

4. The insert of claim 1 wherein said insert is intended for use with foods selected from the group consisting of poultry, meat, fish and sausage.

5. The insert of claim 1 wherein said outer covering is made from an acid free paper.

6. The insert of claim 1 wherein said outer covering is a bleached cellulose acetate crepe paper.

7. The insert of claim 1 wherein said filling further includes kieselguhr.

8. A food pack including the insert of claim 1.

9. The insert of claim 1, wherein said bag is substantially flat.

* * * * *